United States Patent
Komatsu et al.

(10) Patent No.: US 11,414,280 B2
(45) Date of Patent: Aug. 16, 2022

(54) CRANE CONTROL SYSTEM AND CRANE CONTROL METHOD

(71) Applicant: MITSUI E&S MACHINERY CO., LTD., Tokyo (JP)

(72) Inventors: Takayuki Komatsu, Oita (JP); Shigeyuki Nakada, Oita (JP); Junya Miyata, Oita (JP)

(73) Assignee: Mitsui E&S Machinery Co., Ltd., Tokyo (JP)

( * ) Notice: Subject to any disclaimer, the term of this patent is extended or adjusted under 35 U.S.C. 154(b) by 204 days.

(21) Appl. No.: 16/626,916

(22) PCT Filed: Mar. 16, 2018

(86) PCT No.: PCT/JP2018/010656
§ 371 (c)(1),
(2) Date: Dec. 27, 2019

(87) PCT Pub. No.: WO2019/003512
PCT Pub. Date: Jan. 3, 2019

(65) Prior Publication Data
US 2020/0130964 A1  Apr. 30, 2020

(30) Foreign Application Priority Data

Jun. 29, 2017  (JP) .............................. JP2017-127312

(51) Int. Cl.
*B65G 63/00* (2006.01)
*B65G 67/60* (2006.01)
(Continued)

(52) U.S. Cl.
CPC ........... *B65G 63/004* (2013.01); *B65G 67/60* (2013.01); *B66C 13/18* (2013.01); *B66C 19/00* (2013.01);
(Continued)

(58) Field of Classification Search
CPC ................. B65G 63/004; B65G 67/60; B65G 2203/0283; B65G 2814/0302;
(Continued)

(56) References Cited

U.S. PATENT DOCUMENTS

2015/0112476 A1   4/2015  Torson et al.

FOREIGN PATENT DOCUMENTS

| | | |
|---|---|---|
| JP | S63-196490 A | 8/1988 |
| JP | H10-330078 A | 12/1998 |

(Continued)

*Primary Examiner* — Lynn E Schwenning
(74) *Attorney, Agent, or Firm* — Carrier Blackman & Associates, P.C.; Joseph P. Carrier; Jeffrey T. Gedeon (57) ABSTRACT

A control system for a quay crane a mounting platform position acquisition device, a land-side position acquisition device, a transportation vehicle position acquisition device, and a control device. The control system 30 is configured such that, when the control device predicts that a standby time will occur for a land-side cargo handling device based on a vehicle stop position, a current position of a relay mounting platform, a current position of the land-side cargo handling device, and a current position of an in-terminal transportation vehicle, the control device performs control that moves the relay mounting platform to a relay position which equalizes an actual land-side cycle time for the land-side cargo handling device including the standby time and a sea-side cycle time for a sea-side cargo handling device with each other.

6 Claims, 8 Drawing Sheets

(51) Int. Cl.
  *B66C 19/00* (2006.01)
  *B66C 13/18* (2006.01)
  *B66C 13/08* (2006.01)
  *G01C 21/34* (2006.01)

(52) U.S. Cl.
  CPC ............... *B65G 2203/0283* (2013.01); *B65G 2814/0302* (2013.01); *B65G 2814/0397* (2013.01); *B66C 13/08* (2013.01); *B66C 2700/08* (2013.01); *G01C 21/34* (2013.01)

(58) Field of Classification Search
  CPC . B65G 2814/0397; B66C 13/18; B66C 19/00; B66C 13/08; B66C 2700/08
  See application file for complete search history.

(56) References Cited

FOREIGN PATENT DOCUMENTS

| | | | | |
|---|---|---|---|---|
| JP | H 10330078 | * | 12/1998 | ............ B66C 19/00 |
| JP | 2000-211743 A | | 8/2000 | |
| JP | 2004-189460 A | | 7/2004 | |
| JP | 2004189460 | * | 7/2004 | ............ B65G 63/00 |
| JP | 2005-082349 A | | 3/2005 | |
| JP | 2005082349 | * | 3/2005 | ............ B65G 63/00 |

* cited by examiner

CRANE CONTROL SYSTEM AND CRANE CONTROL METHOD

TECHNICAL FIELD

The present invention relates to a crane control system and a crane control method and more specifically to a crane control system and a crane control method that improve cargo handling efficiency.

BACKGROUND ART

A crane has been proposed which has two trolleys, sets a relay point between the two trolleys, and moves the relay point according to the container loading/unloading position on a container ship such that the cargo handling paths for the two trolleys have an equal length (see Patent Document 1, for example). With this crane, the cycle times required for the container handling operations by the two trolleys are made equal by setting the relay point at such a position that the cargo handling paths for the two trolleys have an equal length.

PRIOR ART DOCUMENT

Patent Document

Patent Document 1: Japanese patent application Kokai publication No. Sho 63-196490

SUMMARY OF THE INVENTION

Problem to be Solved by the Invention

Meanwhile, the crane described in Patent Document 1 performs container handling with a container ship on the sea side while performing container handling with a transportation vehicle such as a manned transportation vehicle, an automated guided vehicle (AGV), or a stacker crane on the land side. Each transportation vehicle has a different time of arrival at the position where the crane can perform cargo handling.

The crane described in Patent Document 1 does not take this arrival time of each transportation vehicle into consideration. For this reason, with the crane described in Patent Document 1, if a standby time occurs for the trolley on the land side among the two trolleys for a transportation vehicle, containers will accumulate at the relay point in the case of unloading containers from a container ship and a container will not arrive at the relay point in the case of loading containers onto a container ship. In other words, the occurrence of a standby time for one trolley also causes a standby time for the other trolley. Thus, the occurrence of a standby time for one of the two trolleys is a cause of decrease in cargo handling efficiency.

An object of the present invention is to provide a crane control system and a crane control method capable of improving cargo handling efficiency even if a standby time occurs for one of a plurality of cargo handling devices.

Means for Solving the Problem

A crane control system for controlling a crane, according to the present invention to achieve the above object is a crane control system for controlling a crane including a leg structure standing on a quay, a girder part supported on the leg structure and having one end projecting to a sea side from the structure and another end projecting to a land side from the structure, a relay mounting platform which is configured to be movable in at least one of a vertical direction and an extending direction of the girder part at a center portion of the girder part in the extending direction and on which a container is temporarily mounted, a land-side cargo handling device which performs container handling between the relay mounting platform and a transportation vehicle stopped at a vehicle stop position under the other end of the girder part, and a sea-side cargo handling device which performs container handling between the relay mounting platform and a designated cargo handling position on a container ship moored under the one end of the girder part. Here, the crane control system includes a position acquisition device which acquires current positions of the land-side cargo handling device, the sea-side cargo handling device, and the transportation vehicle and a control device which is connected to the sea-side cargo handling device, the land-side cargo handling device, the relay mounting platform, and the position acquisition device, the vehicle stop position and the cargo handling position have been set in the control device in advance, and the crane control system is configured such that when the control device predicts that a standby time will occur in a container handling operation by one cargo handling device among the land-side cargo handling device and the sea-side cargo handling device based on the set vehicle stop position, the set cargo handling position, and the current positions of the land-side cargo handling device, the sea-side cargo handling device, and the transportation vehicle acquired by the position acquisition device, the control device performs control that moves the relay mounting platform to a position which equalizes a cycle time of the container handling operation by the one cargo handling device including the predicted standby time and a cycle time of the container handling operation by the other cargo handling device with each other.

A crane control method according to the present invention to achieve the above object is a crane control method including moving a relay mounting platform in at least one of a vertical direction and an extending direction of a girder part at a center portion of the girder part in the extending direction, the girder part being supported on a leg structure which stands on a quay, having one end projecting to a sea side from the structure, and having another end projecting to a land side from the structure, and causing a land-side cargo handling device to perform container handling between the relay mounting platform and a transportation vehicle stopped at a vehicle stop position under the land side of the girder part while causing a sea-side cargo handling device to perform container handling between the relay mounting platform and a cargo handling position on a container ship moored under the sea side of the girder part. Here, The crane control method includes consecutively acquiring current positions of the land-side cargo handling device, the sea-side cargo handling device, and the transportation vehicle, predicting whether a standby time will occur in a container handling operation by one cargo handling device among the land-side cargo handling device and the sea-side cargo handling device based on the vehicle stop position and the cargo handling position, which have been set in advance, and the acquired current positions of the land-side cargo handling device, the sea-side cargo handling device, and the transportation vehicle, when the standby time is predicted to occur, calculating a position which equalizes a cycle time of the container handling operation by the one cargo handling device including the standby time and a cycle time of the container handling operation by the other cargo handling device with each other; and moving the relay mounting platform to the calculated equalizing position.

Effect of the Invention

According to the present invention, when a standby time is predicted to occur for one of the land-side cargo handling device and the sea-side cargo handling device, the relay mounting platform is moved to a position which equalizes the cycle time for the one cargo handling device including the standby time and the cycle time for the other cargo handling device without the standby time. In other words, the amount of container handling operation for the one cargo handling device with the standby time is decreased while the amount of container handling operation for the other cargo handling device without the standby time is increased. This makes it possible to shorten the standby time for the other cargo handling device caused by the occurrence of the standby time for the one cargo handling device. This is advantageous for optimization of the cycle time for the crane as a whole and can improve the efficiency of container handling between a container ship and a transportation vehicle even if a standby time occurs for one of the cargo handling machines.

MODES FOR CARRYING OUT THE INVENTION

Embodiments of a crane control system and a crane control method according to the present invention will be described below. In drawings, the longitudinal direction of storage lanes 13 is illustrated as an x direction, the transverse direction of the storage lanes 13 is illustrated as a y direction, and the vertical direction is illustrated as a z direction.

Figure 1:
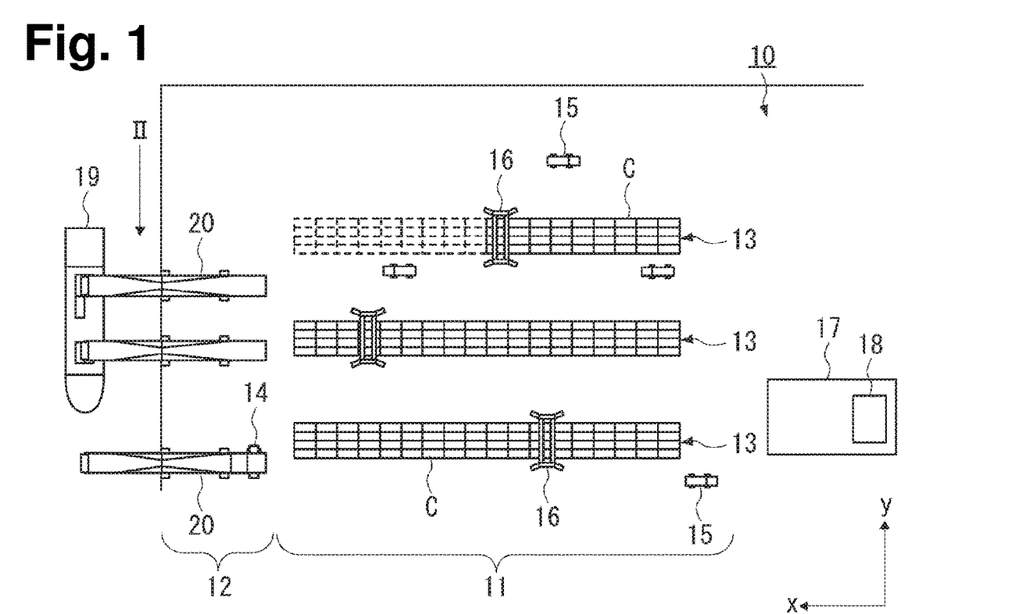
FIG. 1 is a configuration diagram exemplarily illustrating a container terminal in which are installed cranes equipped with a control system in a first embodiment of the present invention.
Figure 2:
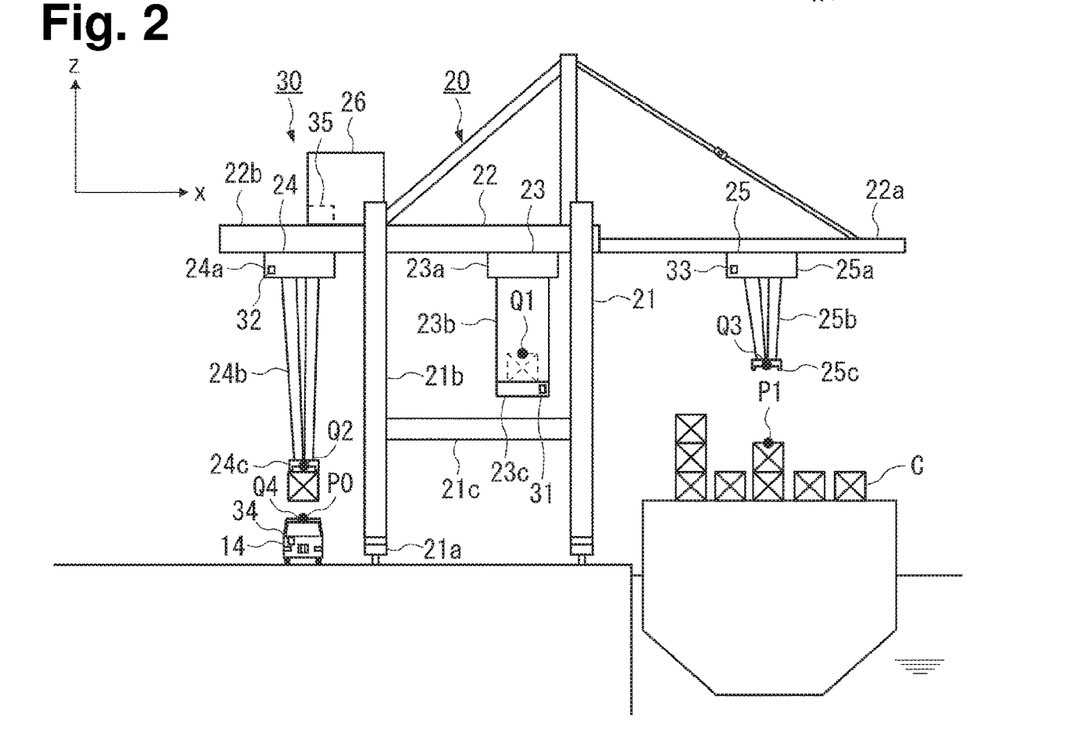
FIG. 2 is a configuration diagram exemplarily illustrating the control system in FIG. 1.
Figure 3:
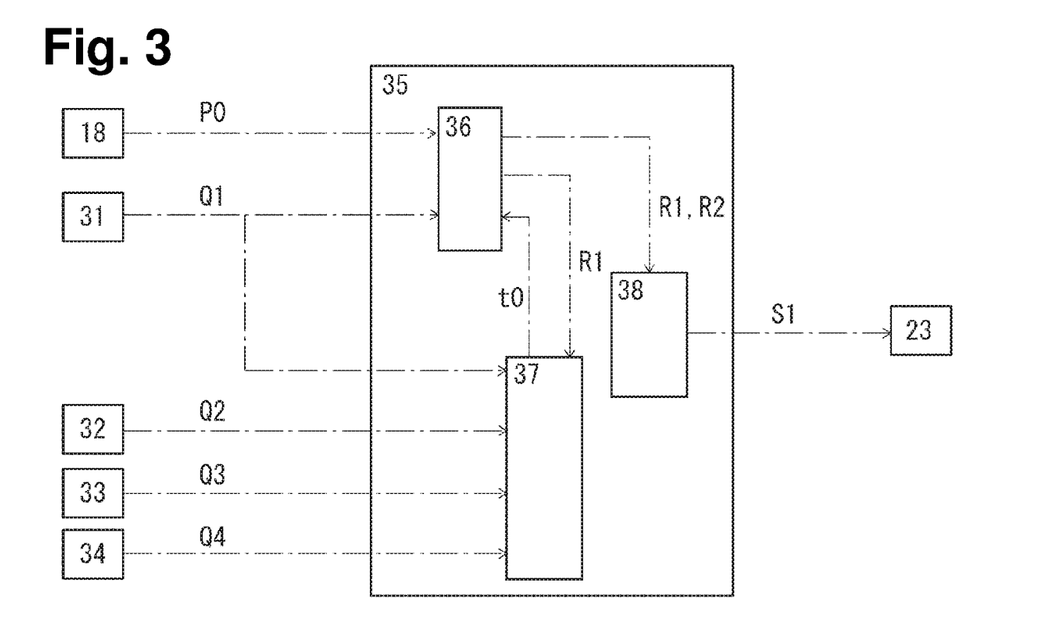
FIG. 3 is a block diagram exemplarily illustrating the control system in FIG. 2.

As exemplarily illustrated in FIGS. 1 to 3, a control system 30 in a first embodiment is a system that controls handling of containers C at a container terminal 10 with quay cranes (also called gantry cranes) 20 that handle the containers C.

As exemplarily illustrated in FIG. 1, the container terminal 10 is divided into a container yard 11 and a ship loading-unloading area 12 abutting each other in the x direction. The container yard 11 comprises a plurality of storage lanes 13 where a number of containers C are stored. The ship loading-unloading area 12 comprises a plurality of quay cranes 20, which travel on rails laid along a quay. The storage lanes 13 may be installed with their longitudinal direction oriented in the y direction.

In-terminal transportation vehicles 14 and external transportation vehicles 15 travel in the container terminal 10, the in-terminal transportation vehicles 14 being vehicles that transport containers C between the container yard 11 and the ship loading-unloading area 12, the external transportation vehicles 15 being vehicles that transport containers C between the container yard 11 and the outside. Also, in the container terminal 10, a plurality of gantry cranes 16 travel in the x direction along the storage lanes 13 in a straddling position over the storage lanes 13.

A management building 17 is built in the container terminal 10. A host system 18 is installed in the management building 17, and the host system 18 issues cargo handling instructions to the cargo handling machines (14 to 16, 20) and performs other operations via communication equipment.

The container terminal 10 may exemplarily be an automated terminal in which the cargo handling machines are capable of performing automated cargo handling in accordance with instructions from the host system 18 or a terminal in which a remote operation controller or the like is installed in the management building 17 and the cargo handling machines can be remotely operated with it. Alternatively, the container terminal 10 may exemplarily be a terminal in which operators get in and directly operate the cargo handling machines.

As exemplarily illustrated in FIG. 2, each quay crane 20 comprises a leg structure 21, a girder part 22, a relay mounting platform 23, a land-side cargo handling device 24, and a sea-side cargo handling device 25.

The leg structure 21 is configured of: a plurality of legs 21b which are equipped at their lower ends with travel devices 21a capable of traveling along the rails laid on the quay and extending in the y direction, and extend upward from the travel devices 21a; and a horizontal beam 21c coupling the legs 21b to each other.

The girder part 22 is supported on a top portion of the leg structure 21 and configured of a boom 22a projecting to the sea side in the x direction from the leg structure 21 and a girder 22b projecting to the land side in the x direction from the leg structure 21. Note that the girder part 22 may exemplarily be a shuttle boom that projects to the sea side in the x direction from the leg structure 21 during cargo handling and projects to the land side in the x direction from the leg structure 21 during standby, or of a middle bent type in which the boom 22a is bent at a middle position in the x direction during standby.

The relay mounting platform 23 is a movable platform which is configured to be movable at least in one of the x direction and the z direction at a center portion of the girder part 22 in the x direction and on which a container C is temporarily mounted. Specifically, the relay mounting platform 23 has a relay trolley 23a, wires 23b, and a mounting platform body 23c. The relay trolley 23a is supported on the girder part 22 and configured to be movable on the girder part 22 in the x direction. The mounting platform body 23c is a platform on the upper end of which a container C is temporarily mounted, and is suspended by the plurality of wires 23b, which hang down from a center portion of the relay trolley 23a in plan view, and is vertically raised or lowered as the wires 23b are reeled in or out.

The relay mounting platform 23 may be configured such that the relay trolley 23a is movable in the x direction with a container C mounted on the mounting platform body 23c or the mounting platform body 23c is movable in the z direction.

The land-side cargo handling device 24 has a land-side trolley 24a, wires 24b, and a land-side suspending member (also called a spreader) 24c. The land-side trolley 24a is supported on the girder part 22 and configured to be movable on the girder part 22 in the x direction. The land-side suspending member 24c is configured such that its lower end can be joined to the upper end of a container. The land-side suspending member 24c is suspended by the plurality of wires 24b, which hang down from a center portion of the land-side trolley 24a in plan view, and is vertically raised or lowered as the wires 24b are reeled in or out.

The sea-side cargo handling device 25 has a sea-side trolley 25a, wires 25b, and a sea-side suspending member 25c. The sea-side trolley 25a is supported on the girder part 22 and is configured to be movable on the girder part 22 in the x direction. The sea-side suspending member 25c is configured such that its lower end can be joined to the upper end of a container. The sea-side suspending member 25c is suspended by the plurality of wires 25b, which hang down from a center portion of the sea-side trolley 25a in plan view, and is vertically raised or lowered as the wires 25b are reeled in or out.

The quay crane 20 includes a machine house 26 installed on the upper end of a land-side end portion of the girder part 22, and driving devices not illustrated that drive the relay mounting platform 23, the land-side cargo handling device 24, and the sea-side cargo handling device 25 are housed in the machine house 26. Note that the driving devices may be installed on the relay mounting platform 23, the land-side cargo handling device 24, and the sea-side cargo handling device 25, respectively.

The control system 30 comprises a mounting platform position acquisition device 31, a land-side position acquisition device 32, a sea-side position acquisition device 33, a transportation vehicle position acquisition device 34, and a control device 35.

The mounting platform position acquisition device 31, the land-side position acquisition device 32, the sea-side position acquisition device 33, and the transportation vehicle position acquisition device 34 are devices that consecutively acquire the current positions (Q1 to Q4) of the relay mounting platform 23, the land-side cargo handling device 24, the sea-side cargo handling device 25, and the in-terminal transportation vehicle 14, respectively.

The mounting platform position acquisition device 31, the land-side position acquisition device 32, and the sea-side position acquisition device 33 may each exemplarily be a global navigation satellite system (GLASS) antenna or a device that consecutively acquires the current position by calculating the distance of movement of the trolley in the x direction and the distance of movement of a hoisted object in the z direction based on the state of driving of the corresponding driving device. The current positions (Q1 to Q3) may exemplarily be the current positions within the cargo handing paths of the land-side cargo handling device 24 and the sea-side cargo handling device 25. For example, the current position Q1 of the relay mounting platform 23 may exemplarily be the center position of the upper end of a container C mounted on the mounting platform body 23c. The current position Q2 of the land-side cargo handling device 24 may exemplarily be the center position of the lower end of the land-side suspending member 24c. The current position Q3 of the sea-side cargo handling device 25 may exemplarily be the center position of the lower end of the sea-side suspending member 25c.

The transportation vehicle position acquisition device 34 may exemplarily be a GNSS antenna or an RFID tag installed on the in-terminal transportation vehicle 14. The current position Q4 of the in-terminal transportation vehicle 14 may exemplarily be the center position of the upper end of a container C mounted on the in-terminal transportation vehicle 14.

The control device 35 is hardware configured of a CPU that performs various types of information processing, programs to be used to perform these various types of information processing, an internal storage device which information processing results can be read from and written to, various interfaces, and so on. The control device 35 is installed in the machine house 26 and are electrically connected via signal lines to the driving devices not illustrated that drive the relay mounting platform 23, the land-side cargo handling device 24, and the sea-side cargo handling device 25. Also, the control device 35 is communicatively connected to each position acquisition device (31 to 34) via a radio antenna.

As exemplarily illustrated in FIG. 3, the control device 35 has a calculation unit 36, a prediction unit 37, and a control unit 38 as its functional elements. The calculation unit 36 is a functional element that calculates an assumed position R1 of the relay mounting platform 23 upon receipt of a cargo handling instruction S0 from the host system 18. The calculation unit 36 is also a functional element that calculates a relay position R2 of the relay mounting platform 23 when the prediction unit 37 predicts that a standby time t0 will occur from arrival of the land-side cargo handling machine 24 at a position above a vehicle stop position P0 until arrival of the in-terminal transportation vehicle 14 at the vehicle stop position P0. The prediction unit 37 is a functional element that predicts whether a standby time t0 will occur for the land-side cargo handling machine 24 on the assumption that the relay mounting platform 23 is present at the assumed position R1. The control unit 38 is a functional element that issues an instruction S1 to move the relay mounting platform 23 to the assumed position R1 or the relay position R2, calculated by the calculation unit 36, to the driving device of the relay mounting platform 23. The functional elements are stored as programs in the internal storage device and are executed by the CPU on a timely basis. Note that, instead of being programs, the functional elements may be devices that perform their functions independently.

Figure 4:
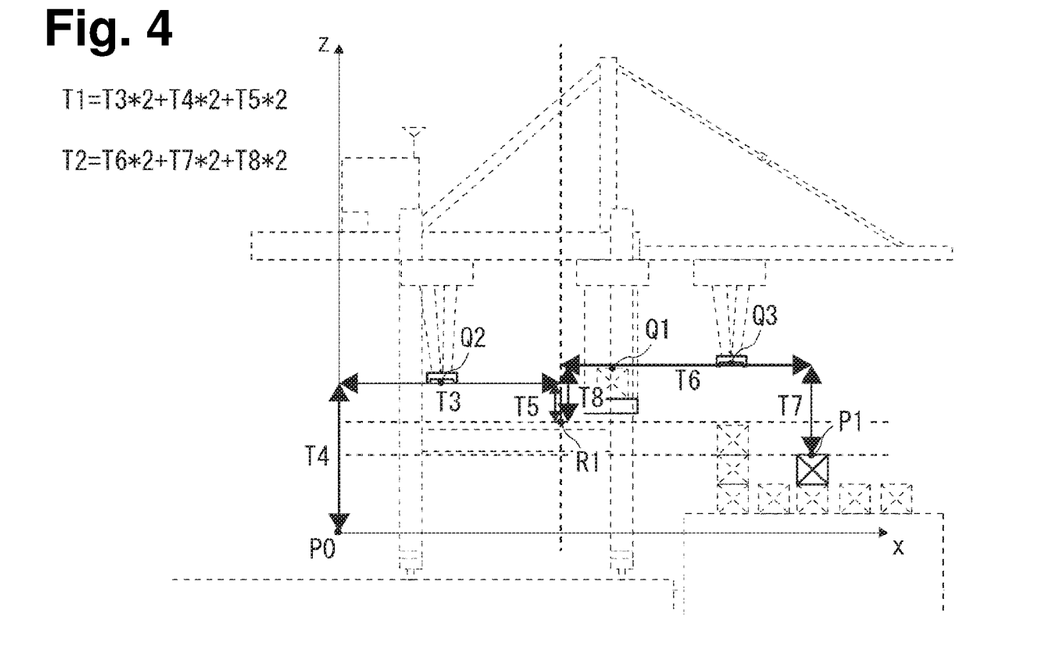
FIG. 4 is an explanatory diagram exemplarily illustrating an assumed position.

As exemplarily illustrated in FIG. 4, the assumed position R1 is set based on the vehicle stop position P0 for the in-terminal transportation vehicle 14, which has been set in advance, and a cargo handling position P1 on a container ship 19 corresponding to a cargo handling instruction S0 transmitted from the host system 18. Specifically, the assumed position R1 is a position which equalizes an assumed ideal land-side cycle time T1 for a cargo handling operation for a container C by the land-side cargo handling device 24 without a standby time t0 and an assumed ideal sea-side cycle time T2 for a cargo handling operation for the container C by the sea-side cargo handling device 25.

Note that while the vehicle stop position P0 is a preset position, the vehicle stop position P0 may be changed for each in-terminal transportation vehicle 14. In this case, each time the vehicle stop position P0 is changed, it is transmitted to the control device 35 from the host system 18.

The assumed land-side cycle time T1 is the total time of: a time T3×2 required for the land-side trolley 24a to make a round trip across the section between the position above the vehicle stop position P0 and a position above the assumed position R1; a time T4×2 required for the land-side suspending member 24c to lower and rise to pass or receive a container C onto or from the in-terminal transportation vehicle 14; and a time T5×2 required for the land-side suspending member 24c to lower and rise to pass the container C onto or from the relay mounting platform 23.

The assumed sea-side cycle time T2 is the total time of: a time T6×2 required for the sear-side trolley 25a to make a round trip across the section between a position above the cargo handling position P1 and the position above the assumed position R1; a time T7×2 required for the sea-side suspending member 25c to lower and rise to pass or receive the container C onto or from the cargo handling position P1; and a time T8×2 required for the sea-side suspending member 25c to lower and rise to pass the container C onto or from the relay mounting platform 23.

Note that the times required to make a round trip (T3, T6) are preferably calculated using the average moving speeds of the land-side trolley 24a and the sea-side trolley 25a. Also, the times required to pass or receive a container C (T4, T5, T7, T8) are difficult to predict with a sensor or the like. It is preferable to measure the actual time required to pass or receive a container C a certain number of times and use a moving average of the measured times. In this embodiment, used is a moving average of the times required to pass or receive a container C that were measured five times.

Figure 5:
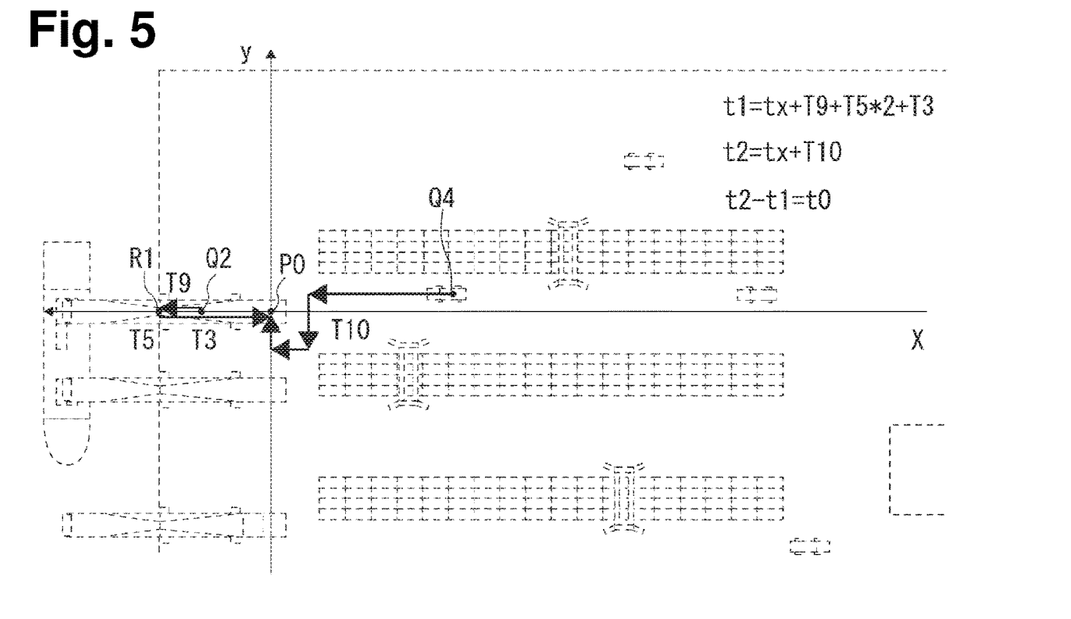
FIG. 5 is an explanatory diagram exemplarily illustrating a standby time.

As exemplarily illustrated in FIG. 5, the standby time t0 is the difference between a land-side arrival time t1 and a transportation vehicle arrival time t2 based on the assumption that the relay mounting platform 23 is present at the assumed position R1.

The land-side arrival time t1 is a time point calculated by adding the time required for the land-side trolley 24a to arrive at the position above the vehicle stop position P0 from the current position Q2 to the calculation starting time tx, and is calculated consecutively. The time required for the arrival corresponds to the time point calculated by adding the total time of a time T9 required to arrive at the position above the relay mounting platform 23 present at the assumed position R1 from the current position Q2 and the above-mentioned time T5×2 and the above-mentioned time T3.

The transportation vehicle arrival time t2 is the time point calculated by adding a time T10 required for the in-terminal transportation vehicle 14 to arrive at the vehicle stop position P0 from the current position Q4 to the calculation starting time tx. Note that the time T10 required for the arrival is preferably calculated using the average moving speed of the in-terminal transportation vehicle 14. Alternatively, the transportation vehicle arrival time t2 may be acquired from the host system 18 in the management building 17.

Figure 6:
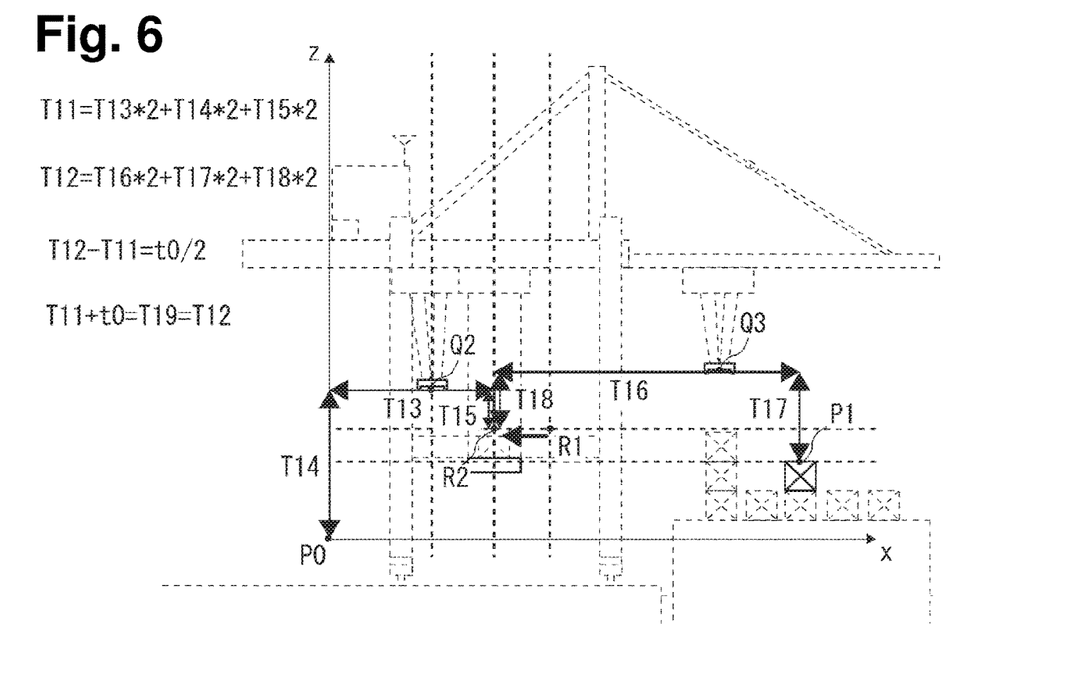
FIG. 6 is an explanatory diagram exemplarily illustrating a relay position.

As exemplarily illustrated in FIG. 6, the relay position R2 is a position which equalizes a land-side cycle time T19 and a sea-side cycle time T12 with each other, the land-side cycle time T19 being calculated by adding the standby time t0 to a land-side cycle time T11 based on the assumption that the relay mounting platform 23 is preset at the relay position R2. Note that the equalizing position also includes a position that makes the land-side cycle time T19 and the sea-side cycle time T12 substantially equal to each other.

Specifically, the relay position R2 is a position that decreases the amount of container handling operation by the land-side cargo handling device 24 and increases the amount of container handling operation by the sea-side cargo handling device 25 by the standby time t0, which is the difference between the land-side arrival time t1 and the transportation vehicle arrival time t2. The land-side cycle time T11 is decreased to be shorter by a half of the standby time t0 than the assumed land-side cycle time T1, which is based on the assumption that the relay mounting platform 23 is present at the assumed position R1. The sea-side cycle time T12 is increased to be longer by a half of the standby time t0 than the assumed sea-side cycle time T2, which is based on the assumption that the relay mounting platform 23 is present at the assumed position R1. In sum, the land-side cycle time T11 is decreased to be shorter than the sea-side cycle time T12 by the standby time to.

The land-side cycle time T11 is the total time of: a time T13×2 required for the land-side trolley 24a to make a round trip across the section between the position above the vehicle stop position P0 and a position above the relay position R2; a time T14×2 required for the land-side suspending member 24c to lower and rise to pass or receive a container C onto or from the in-terminal transportation vehicle 14; and a time T15×2 required for the land-side suspending member 24c to lower and rise to pass the container C onto or from the relay mounting platform 23.

The sea-side cycle time T12 is the total time of: a time T16×2 required for the sear-side trolley 25a to make a round trip across the section between the position above the cargo handling position P1 and the position above the relay position R2; a time T17×2 required for the sea-side suspending member 25c to lower and rise to pass or receive the container C onto or from the cargo handling position P1; and a time T18×2 required for the sea-side suspending member 25c to lower and rise to pass or receive the container C onto or from the relay mounting platform 23.

Figure 7:
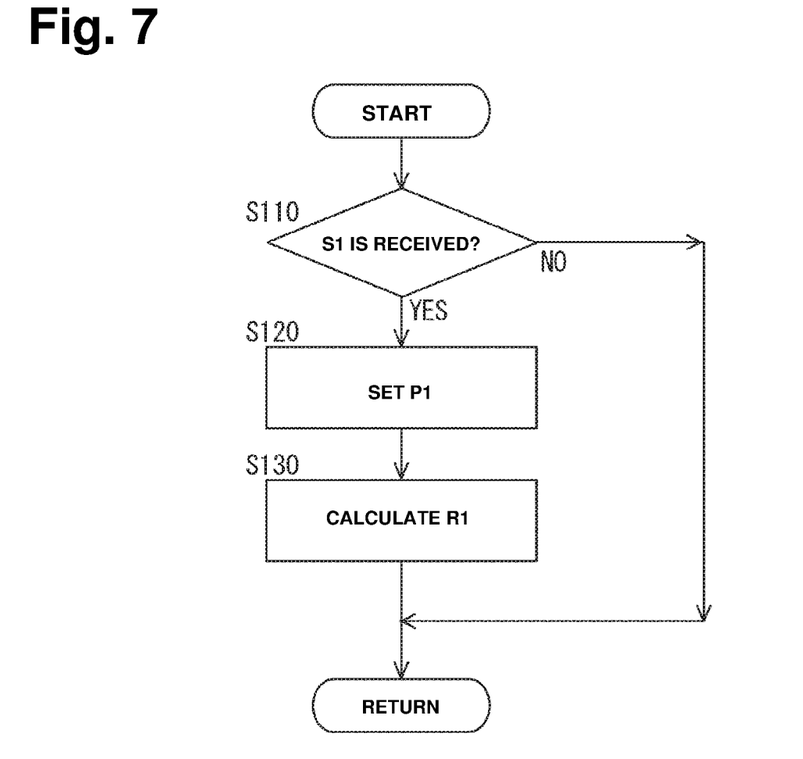
FIG. 7 is a first flowchart exemplarily illustrating a first embodiment of a crane control method according to the present invention.

As exemplarily illustrated in FIG. 7, the calculation unit 36 of the control device 35 performs control that calculates the assumed position R1. This control is performed at preset periodic intervals. Specifically, upon receipt of a cargo handling instruction S0 from the host system 18 (S110: YES), the calculation unit 36 sets the cargo handling position P1 on the container ship 19 based on the cargo handling instruction S0 (S120).

Then, the calculation unit 36 calculates the assumed position R1 which equalizes the assumed land-side cycle time T1 and the assumed sea-side cycle time T2 with each other based on the preset vehicle stop position P0 and the cargo handling position P1 (S130).

An example of this step will be exemplarily described below. The calculation unit 36 calculates the middle point between the vehicle stop position P0 and the cargo handling position P1 (the middle point of the cargo handling path) as an assumed position R1. Then, the calculation unit 36 calculates an assumed land-side cycle time T1 based on the vehicle stop position P0 and the calculated assumed position R1 and also calculates an assumed sea-side cycle time T2 based on the cargo handling position P1 and the assumed position R1. Then, the calculation unit 36 calculates the difference between the assumed land-side cycle time T1 and the assumed sea-side cycle time T2. Then, the calculation unit 36 corrects the assumed position R1 based on the difference.

Another example of the above step may exemplarily be a method in which the calculation unit 36 calculates the assumed position R1 by using map data in which assumed positions R1 are set in advance in association with cargo handling positions P1 based on experiments and tests.

After the assumed position R1 is calculated, the processing returns to the start. Note that the assumed position R1 calculated by the calculation unit 36 is stored in the internal storage device.

Figure 8:
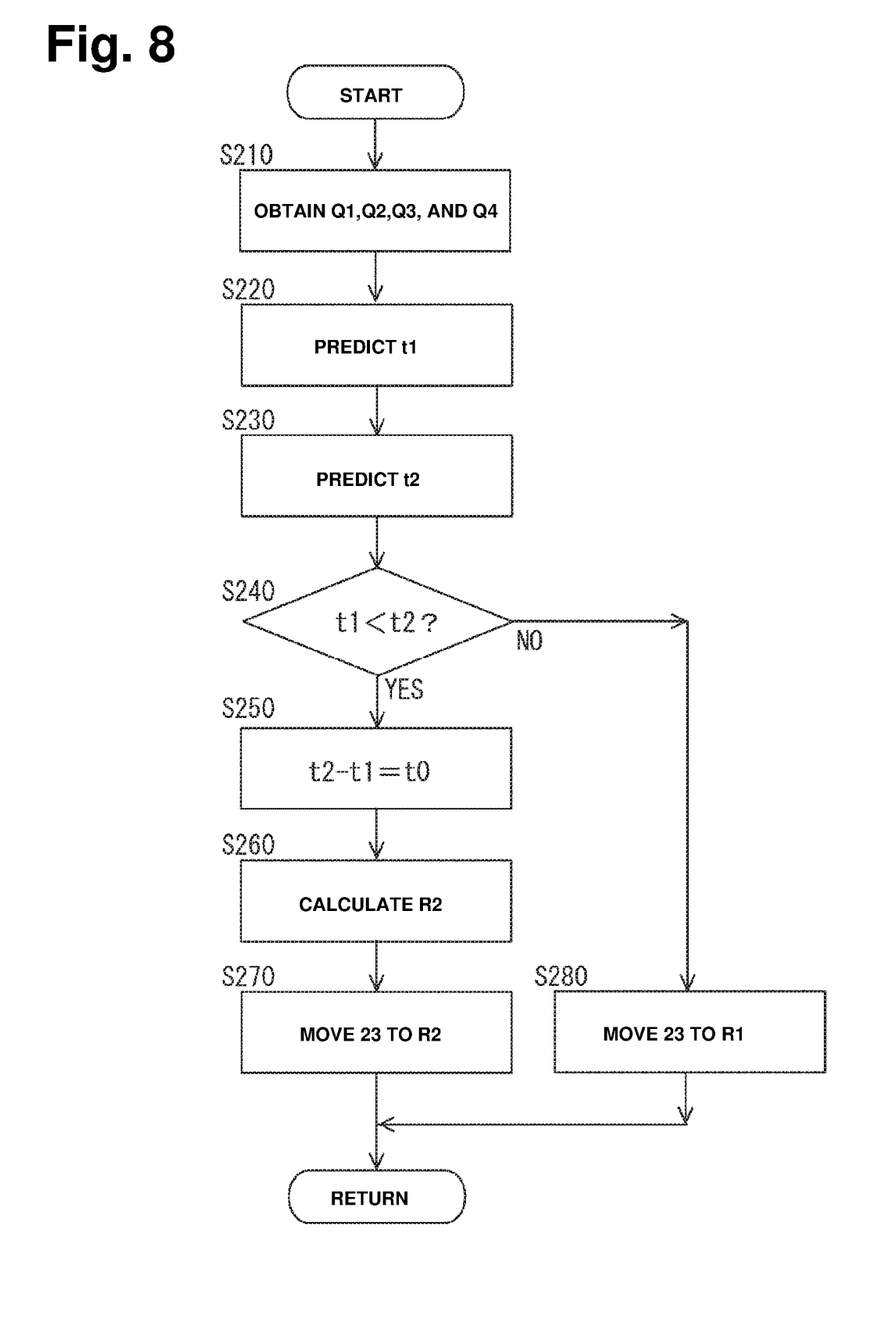
FIG. 8 is a second flowchart exemplarily illustrating the first embodiment of the crane control method according to the present invention.

As exemplarily illustrated in FIG. 8, the prediction unit 37 of the control device 35 performs control that predicts the standby time t0 for the land-side cargo handling device 24. Also, the control unit 38 of the control device 35 performs control that moves the relay mounting platform 23. The control for the prediction and the control for the movement are performed for each loading of a target container C from the in-terminal transportation vehicle 14 onto the container ship 19 and each unloading of a target container C from the container ship 19 onto the in-terminal transportation vehicle 14.

Meanwhile, it is assumed that, at the start, the land-side cargo handling device 24 is present near the position above the vehicle stop position P0 for the in-terminal transportation vehicle 14, and the sea-side cargo handling device 25 is present near the position above the cargo handling position P1 on the container ship 19. It is also assumed that, at the start, the assumed position R1 for the target container C has already been calculated and stored in the internal storage device.

After completion of the handling of the last target container C, the position acquisition devices 31 to 34 acquire the respective current positions (Q1 to Q4) (S210). Then, the prediction unit 37 predicts the land-side arrival time t1 based on the current position Q2 of the land-side cargo handling device 24, the assumed position R1, and the vehicle stop position P0 (S220). Then, the prediction unit 37 predicts the transportation vehicle arrival time t2 based on the current position Q4 of the in-terminal transportation vehicle 14 and the vehicle stop position P0 (S230). Then, the prediction unit 37 determines whether the predicted land-side arrival time t1 is earlier than the transportation vehicle arrival time t2 (S240).

If determining that the land-side arrival time t1 is earlier than the transportation vehicle arrival time t2 (S240: YES), the prediction unit 37 calculates a difference obtained by subtracting the land-side arrival time t1 from the transportation vehicle arrival time t2 as the standby time t0 (S250).

Then, the calculation unit 36 calculates the relay position R2 based on the standby time t0 (S260).

An example of this step will be exemplarily described. The calculation unit 36 calculates the land-side cycle time T11 by subtracting a half of the standby time t0 from the assumed land-side cycle time T1 which is based on the assumption that the relay mounting platform 23 is present at the assumed position R1 calculated in the above-mentioned step S130. Then, the calculation unit 36 calculates the sea-side cycle time T12 by adding a half of the standby time t0 to the assumed sea-side cycle time T2. Then, the calculation unit 36 calculates the relay position R2 based on the calculated land-side cycle time T11 and an ideal sea-side cycle time T12.

Another example of the above step may exemplarily be a method in which the calculation unit 36 calculates the relay position R2 by using map data in which relay positions R2 are set in advance in association with cargo handling positions P1 and standby times t0 based on experiments and tests.

Then, the control unit 38 moves the relay mounting platform 23 to the calculated relay position R2 (S270).

On the other hand, if the land-side arrival time t1 is determined to be the same as or later than the transportation vehicle arrival time t2 (S240: NO), the control unit 38 moves the relay mounting platform 23 to the calculated assumed position R1 (S280).

After the relay mounting platform 23 is moved as described above, the processing returns to the start, and is initiated from the start again when the handling of the next target container C begins (when the handling of the current target container C ends).

Figure 9:
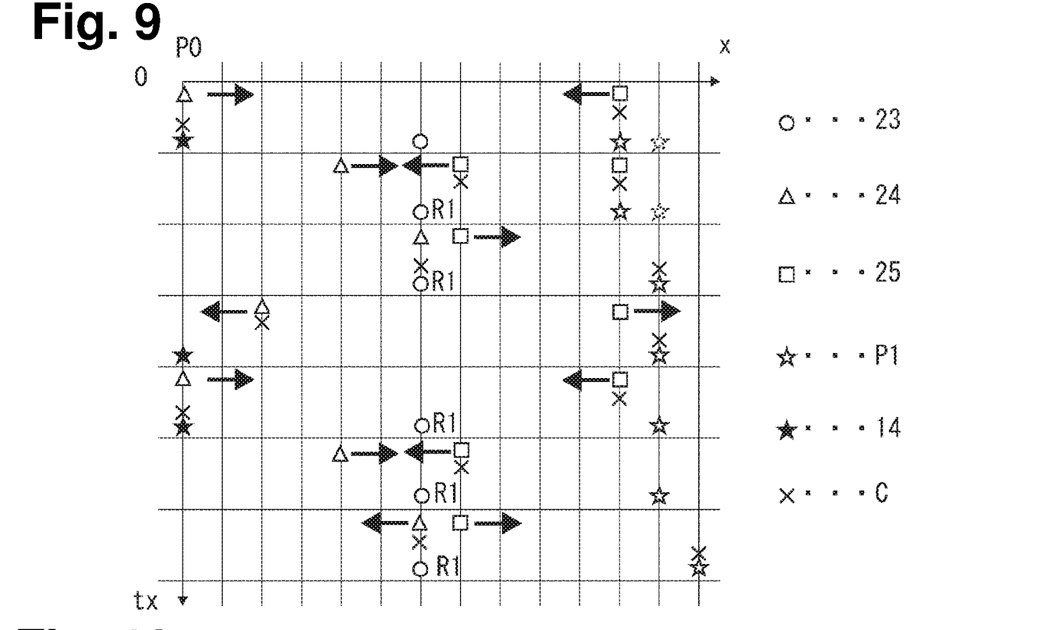
FIG. 9 is a time chart exemplarily illustrating operations in a case where a land-side arrival time is later than a transportation vehicle arrival time.
Figure 10:
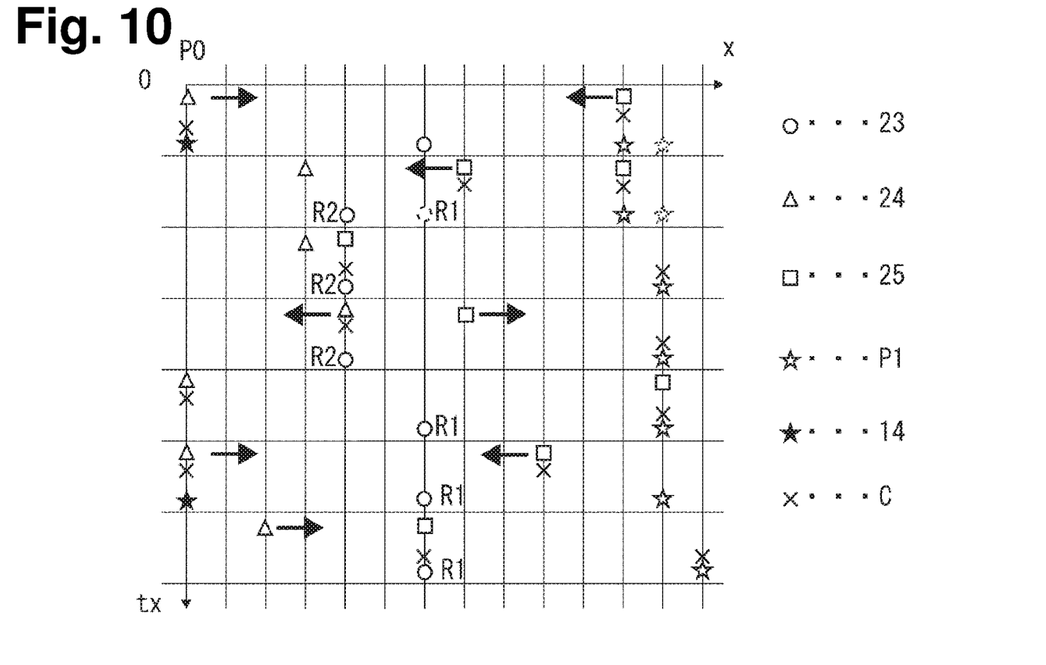
FIG. 10 is a time chart exemplarily illustrating operations in a case where the land-side arrival time is earlier than the transportation vehicle arrival time.
Figure 11:
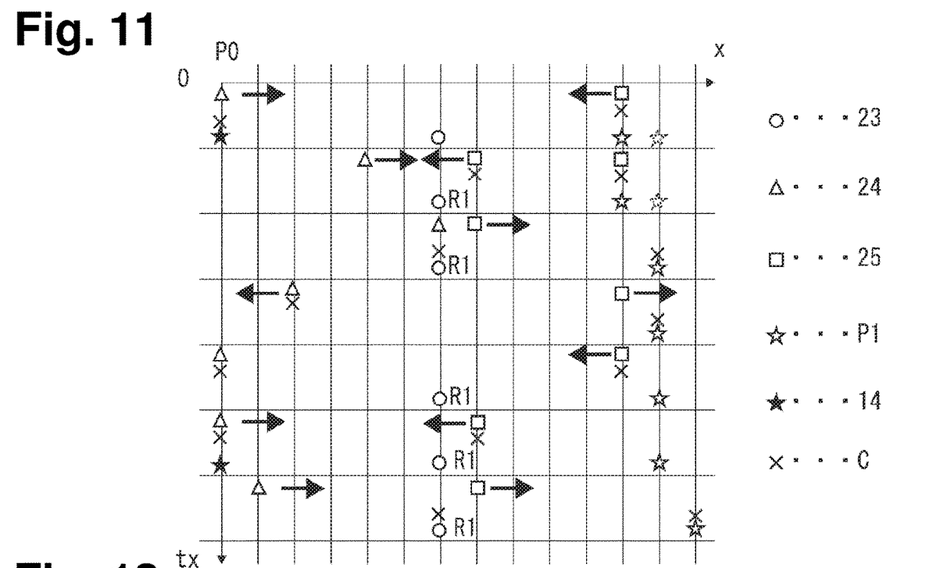
FIG. 11 is a time chart of operations with a conventional technique not using the present invention in the case where the land-side arrival time is earlier than the transportation vehicle arrival time.

In FIGS. 9 to 11, the horizontal axis represents the distance of movement in the x direction while the vertical axis represents the passage of time. As exemplarily illustrated in FIG. 9, the above-described control system 30 performs control that moves the relay mounting platform 23 to the assumed position R1 (S110 to S130, S210 to S280) when the land-side arrival time t1 is later than the transportation vehicle arrival time t2. As described above, when a standby time t0 does not occur, the relay mounting platform 23 is moved to the assumed position R1, at which the assumed land-side cycle time T1 and the assumed sea-side cycle time T2 will be equal.

As exemplarily illustrated in FIG. 10, the above-described control system 30 performs control that moves the relay mounting platform 23 to the relay position R2 (S110 to S130, S210 to S270) when the land-side arrival time t1 is earlier than the transportation vehicle arrival time t2. Thus, the actual land-side cycle time T19 for the land-side cargo handling device 24 and the sea-side cycle time T12 for the sea-side cargo handling device 25 will be substantially equal despite the occurrence of a standby time t0 during which the land-side cargo handling device 24 will remain standby at the position above the vehicle stop position P0.

As exemplarily illustrated in FIG. 11, when the land-side arrival time t1 is earlier than the transportation vehicle arrival time t2, the control system of the conventional technique leaves the standby time t0 as is, so that the relay mounting platform 23 will remain at the assumed position R1. In other words, the actual cycle time for the land-side cargo handling device 24 and the actual cycle time for the sea-side cargo handling device 25 will differ from each other by the standby time to. If such a difference in cycle time is present, for example, containers C will accumulate at the relay mounting platform 23 in the case of unloading containers C from the container ship 19. Also, a container C will not arrive at the relay mounting platform 23 in the case of loading containers C onto the container ship 19. In other words, the difference in cycle time also causes a standby time for the cargo handling device without the standby time to.

According to the above control system 30, when a standby time t0 is precited to occur for the land-side cargo handling device 24, the relay mounting platform 23 is moved to the relay position R2 which equalizes the actual land-side cycle time T19 for the land-side cargo handling device 24 including the standby time t0 and the sea-side cycle time T12 for the sea-side cargo handling device 25 with each other. In other words, the amount of container handling operation for the land-side cargo handling device 24 with the standby time t0 is decreased while the amount of container handling operation for the sea-side cargo handling device 25 without the standby time t0 is increased. This makes it possible to shorten the standby time for the sea-side cargo handling device 25 caused by the occurrence of the standby time t0 for the land-side cargo handling device 24. This is advantageous for optimization of the cycle time of the crane 20 as a whole and can improve the efficiency of the handling of containers C between the container ship 19 and the in-terminal transportation vehicle 14 even when the standby time t0 occurs for the land-side cargo handling device 24.

In this embodiment, the relay mounting platform 23 is moved to the relay position R2 only when the land-side arrival time t1 is earlier than the transportation vehicle arrival time t2. In other words, the relay mounting platform 23 is moved to the assumed position R1 when the land-side arrival time t1 is later than the transportation vehicle arrival time t2. This is advantageous for reduction of the frequency of moving the relay mounting platform 23 and can suppress the energy consumption for moving the relay mounting platform 23.

Although the relay mounting platform 23 is moved to the relay position R2 when a standby time t0 is predicted to occur for the land-side cargo handling device 24 in this embodiment, the present invention is not limited to this. For example, in the case of cargo handling from the in-terminal transportation vehicle 14 onto the container ship 19, the relay mounting platform 23 may be moved so when the time of arrival of the sea-side cargo handling device 25 at the position above the relay mounting platform 23 present at the assumed position R1 is earlier than the time of arrival of the land-side cargo handling device 24 at the position above the relay mounting platform 23. Also, in the case of unloading a container C from the container ship 19 onto the in-terminal transportation vehicle 14, the relay mounting platform 23 may be moved so when the time of arrival of the land-side cargo handling device 24 at the position above the relay mounting platform 23 present at the assumed position R1 is earlier than the time of arrival of the sea-side cargo handling device 25 at the position above the relay mounting platform 23.

Nonetheless, it is preferable to predict the standby time t0 as the time from arrival of the land-side cargo handling device 24 at the position above the vehicle stop position P0 to arrival of the in-terminal transportation vehicle 14 at the vehicle stop position P0, as in this embodiment. In the cargo handling with the crane 20, a standby time t0 is more likely to occur for the land-side cargo handling device 24 than for the sea-side cargo handling device 25. Thus, simply predicting the occurrence of a standby time t0 for the land-side cargo handling device 24 will also predict the occurrence of the standby time for the sea-side cargo handling device 25 that will be caused by the occurrence of the standby time to.

In sum, the occurrence of a standby time for the land-side cargo handling device 24 also causes a comparable amount of standby time for the sea-side cargo handling device 25, but the standby time for the sea-side cargo handling device 25 is reliably decreased by decreasing the cargo handling time for the land-side cargo handling device 24 while increasing the cargo handling time for the sea-side cargo handling device 25. This makes it possible to decrease the cycle time for the whole.

In this embodiment, the relay mounting platform 23 is moved to the relay position R2 before the land-side cargo handling device 24 arrives at the relay mounting platform 23. This moving of the relay mounting platform 23 to the relay position R2 before the land-side cargo handling device 24 arrives at the relay mounting platform 23 is advantageous for the land-side cargo handling device 24 to avoid the occurrence of a standby time for the relay mounting platform 23.

The quay crane 20 that can be controlled by the control system 30 in the embodiment is not limited to the one exemplarily illustrated in FIG. 2.

Figure 12:
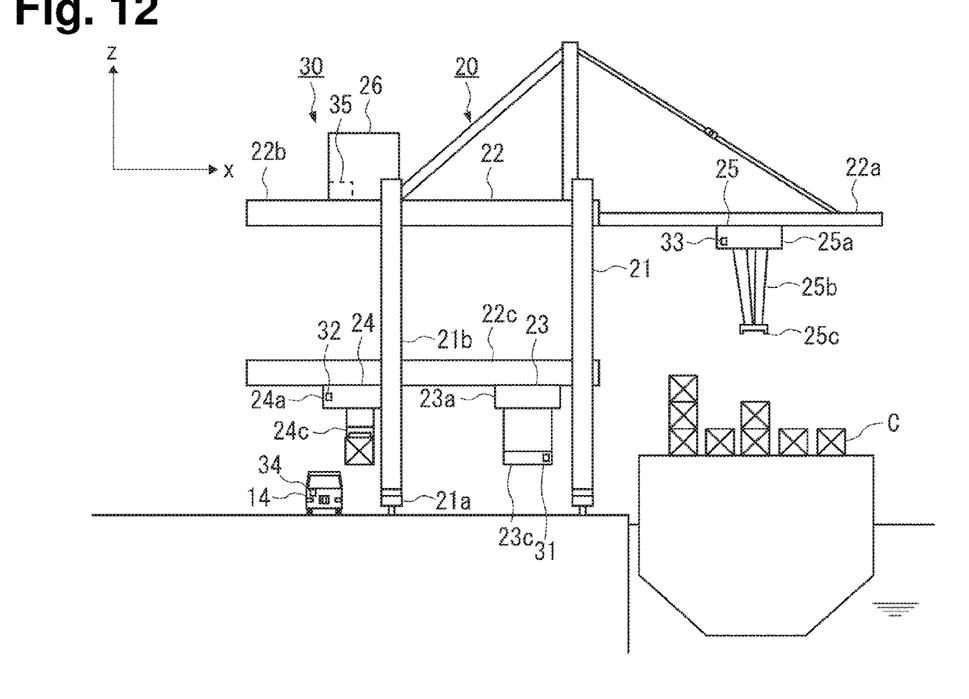
FIG. 12 is a configuration diagram exemplarily illustrating a crane equipped with a control system according to the present invention.

The quay crane 20 that can be controlled by the control system 30 in the embodiment may be one in which, unlike the above-described embodiment, the girder part 22 is separated into two parts and supported on an upper portion and a lower portion of the leg structure 21, as exemplarily illustrated in FIG. 12. This girder part 22 is configured of a boom 22a projecting to the sea side in the x direction from the leg structure 21, a girder 22b projecting to the land side in the x direction from the leg structure 21, and a second girder 22c projecting to the land side in the x direction from the leg structure 21. The relay mounting platform 23 and the land-side cargo handling device 24 are supported on the second girder 22c and move in the x direction, while the sea-side cargo handling device 25 is supported on the boom 22a and the girder 22b and moves in the x direction. Note that the second girder 22c may be configured to be movable in the z direction.

Figure 13:
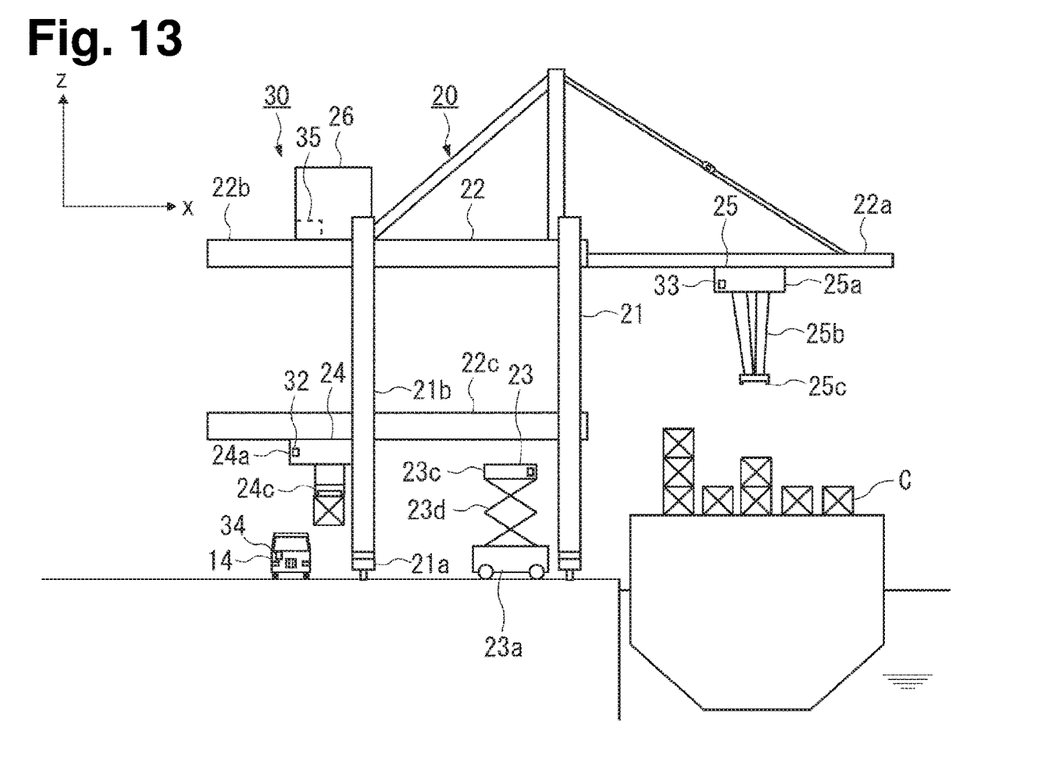
FIG. 13 is a configuration diagram exemplarily illustrating a crane equipped with the control system according to the present invention.

The quay crane 20 that can be controlled by the control system 30 in the embodiment can also be one in which, unlike the above-described embodiment, the relay mounting platform 23 is not supported on the girder part 22, as exemplarily illustrated in FIG. 13. This relay mounting platform 23 has a relay trolley 23a having a travel device capable of travelling on a quay, an extendable device 23d installed at the upper end of this relay trolley 23a, and a mounting platform body 23c installed at the upper end of the extendable device 23d.

As described above, the quay crane 20 that can be controlled by the control system 30 in the embodiment only needs to comprise at least two cargo handling devices of the land-side cargo handling device 24 and the sea-side cargo handling device 25, and the relay mounting platform 23, which is movable between these cargo handling devices in at least one of the x direction and the z direction, and is not limited to the above-described configuration. For example, hydraulic dampers that are extendable and retractable in the vertical direction or the like may be used in place of the wires 23b in the first embodiment.

EXPLANATION OF REFERENCE NUMERALS 14 in-terminal transportation vehicle
19 container ship
20 quay crane
21 leg structure
22 girder part
23 relay mounting platform
24 land-side cargo handling device
25 sea-side cargo handling device
30 control system
31 mounting platform position acquisition device
32 land-side position acquisition device
34 transportation vehicle position acquisition device
35 control device
P0 vehicle stop position
Q1 to Q4 current position
t0 standby time
T12 sea-side cycle time
T19 actual land-side cycle time

The invention claimed is:

1. A crane control system for controlling a crane that includes a leg structure standing on a quay,
a girder part supported on the leg structure and having one end projecting to a sea side from the structure and another end projecting to a land side from the structure,
a relay mounting platform which is configured to be movable in at least one of a vertical direction and an extending direction of the girder part at a center portion of the girder part in the extending direction and on which a container is temporarily mounted,
a land-side cargo handling device which performs container handling between the relay mounting platform and a transportation vehicle stopped at a vehicle stop position under the other end of the girder part, and
a sea-side cargo handling device which performs container handling between the relay mounting platform and a designated cargo handling position on a container ship moored under the one end of the girder part,
wherein the crane control system comprises:
a position acquisition device which acquires current positions of the land-side cargo handling device, the sea-side cargo handling device, and the transportation vehicle; and
a control device which is connected to the sea-side cargo handling device, the land-side cargo handling device, the relay mounting platform, and the position acquisition device,
the vehicle stop position and the cargo handling position have been set in the control device in advance, and
the crane control system is configured such that when the control device predicts that a standby time will occur in a container handling operation by one cargo handling device among the land-side cargo handling device and the sea-side cargo handling device based on the set vehicle stop position, the set cargo handling position, and the current positions of the land-side cargo handling device, the sea-side cargo handling device, and the transportation vehicle acquired by the position acquisition device, the control device performs control that moves the relay mounting platform to a position which equalizes a cycle time of the container handling operation by the one cargo handling device including the predicted standby time and a cycle time of the container handling operation by the other cargo handling device with each other, and
wherein the crane control system is configured such that the control device performs control that
calculates an assumed position which equalizes an assumed land-side cycle time of the container handling operation by the land-side cargo handling device and an assumed sea-side cycle time of the container handling operation by the sea-side cargo handling device with each other based on the set vehicle stop position and the set cargo handling position, and
predicts the standby time based on the calculated assumed position and the current positions of the land-side cargo handling device, the sea-side cargo handling device, and the transportation vehicle acquired by the position acquisition device on an assumption that the relay mounting platform is present at the assumed position.

2. The crane control system according to claim 1, wherein the standby time is predicted as a time from arrival of the land-side cargo handling device at a position above the vehicle stop position to arrival of the transportation vehicle at the vehicle stop position.

3. The crane control system according to claim 2, wherein an equalizing position is a position at which a total distance of a distance of movement of the one cargo handling device in the extending direction and a distance of movement of a container in the vertical direction by the one cargo handling device is shorter than a total distance of a distance of movement of the other cargo handling device in the extending direction and a distance of movement of the container in the vertical direction by the other cargo handling device.

4. The crane control system according to claim 1, wherein the control device performs control that moves the relay mounting platform to an equalizing position at which a total distance of a distance of movement of the one cargo handling machine in the extending direction and a distance of movement of a container in the vertical direction by the one cargo handling machine is shorter than a total distance of a distance of movement of the other cargo handling machine in the extending direction and a distance of movement of the container in the vertical direction by the other cargo handling machine.

5. The crane control system according to claim 1, wherein an equalizing position is a position at which a total distance of a distance of movement of the one cargo handling device in the extending direction and a distance of movement of a container in the vertical direction by the one cargo handling device is shorter than a total distance of a distance of movement of the other cargo handling device in the extending direction and a distance of movement of the container in the vertical direction by the other cargo handling device.

6. A crane control method comprising the steps of: moving a relay mounting platform in at least one of a vertical direction and an extending direction of a girder part at a center portion of the girder part in the extending direction, the girder part being supported on a leg structure which stands on a quay, having one end projecting to a sea side from the structure, and having another end projecting to a land side from the structure;
causing a land-side cargo handling device to perform container handling between the relay mounting platform and a transportation vehicle stopped at a vehicle stop position under the land side of the girder part while causing a sea-side cargo handling device to perform container handling between the relay mounting platform and a cargo handling position on a container ship moored under the sea side of the girder part;
consecutively acquiring current positions of the land-side cargo handling device, the sea-side cargo handling device, and the transportation vehicle;
predicting whether a standby time will occur in a container handling operation by one cargo handling device among the land-side cargo handling device and the sea-side cargo handling device based on the vehicle stop position and the cargo handling position, which have been set in advance, and the acquired current positions of the land-side cargo handling device, the sea-side cargo handling device, and the transportation vehicle;
when the standby time is predicted to occur, calculating a position which equalizes a cycle time of the container handling operation by the one cargo handling device including the standby time and a cycle time of the container handling operation by the other cargo handling device with each other;

calculating an assumed position which equalizes an assumed land-side cycle time of the container handling operation by the land-side cargo handling device and an assumed sea-side cycle time of the container handling operation by the sea-side cargo handling device with each other based on the set vehicle stop position and the set cargo handling position, predicting the standby time based on the calculated assumed position and the current positions of the land-side cargo handling device, the sea-side cargo handling device, and the transportation vehicle acquired by the position acquisition device on an assumption that the relay mounting platform is present at the assumed position, and moving the relay mounting platform to the calculated equalizing position.

* * * * *